United States Patent
Tsujino et al.

(10) Patent No.: US 10,524,314 B2
(45) Date of Patent: Dec. 31, 2019

(54) FLUID HEATING DEVICE OF ENGINE

(71) Applicant: KUBOTA Corporation, Osaka-shi, Osaka (JP)

(72) Inventors: Kazunari Tsujino, Sakai (JP); Yasuo Fujii, Sakai (JP); Mikio Ishida, Sakai (JP); Kouji Horikiri, Sakai (JP); Katsushi Inoue, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 470 days.

(21) Appl. No.: 15/366,723

(22) Filed: Dec. 1, 2016

(65) Prior Publication Data

US 2017/0208651 A1 Jul. 20, 2017

(30) Foreign Application Priority Data

Jan. 19, 2016 (JP) .................................. 2016-007918
Jun. 1, 2016 (JP) .................................. 2016-110093

(51) Int. Cl.
 *H05B 6/10* (2006.01)
 *H05B 6/06* (2006.01)
 *F01M 5/00* (2006.01)

(52) U.S. Cl.
 CPC ............. *H05B 6/108* (2013.01); *F01M 5/001* (2013.01)

(58) Field of Classification Search
 CPC ....... B60H 1/2221; F24H 1/105; F24H 1/142; F24H 2250/08; F01M 5/001; F01M 2013/0027; F02M 31/125; F02M 25/06; H05B 6/108; Y02T 10/121; Y02T 10/126

USPC ............... 219/628, 629, 630, 634, 635, 643; 310/54, 55, 58, 60 A, 306, 411; 239/585.1, 135; 392/441, 456; 60/670, 60/690
See application file for complete search history.

(56) References Cited

U.S. PATENT DOCUMENTS

2010/0034921 A1 2/2010 Bolz et al.
2010/0133363 A1 6/2010 Imoehl

FOREIGN PATENT DOCUMENTS

CN 201359330 Y * 12/2009
DE 10 2006 058 881 A1 6/2008
(Continued)

OTHER PUBLICATIONS

Extended Search Report dated Jun. 20, 2017 in EP Application No. 16199038.7.
(Continued)

*Primary Examiner* — Quang T Van
(74) *Attorney, Agent, or Firm* — Panitch Schwarze Belisario & Nadel LLP

(57) ABSTRACT

A fluid heating device of an engine is provided that is capable of reducing power consumption of a heat source required for heating a fluid. The fluid heating device of the engine includes a heat radiation pipe through which a fluid passes and an induction heating coil. Heat of the heat radiation pipe that is inductively heated by the induction heating coil is radiated to the fluid. A whole periphery of the heat radiation pipe is surrounded by the induction heating coil. The induction heating coil is supported by the heat radiation pipe. A holder is included, and the induction heating coil is supported by the heat radiation pipe via the holder. The holder, to which the induction heating coil is attached, is detachably supported by the heat radiation pipe.

19 Claims, 6 Drawing Sheets

FIRST EMBODIMENT

(56) References Cited

FOREIGN PATENT DOCUMENTS

| | | | |
|---|---|---|---|
| JP | S51138246 A | | 11/1976 |
| JP | 2009277547 A | * | 11/2009 |
| JP | 2011027007 A | | 2/2011 |
| JP | 2012004028 A | | 1/2012 |
| JP | 2013-124566 A | | 6/2013 |
| JP | 2015151063 A | | 8/2015 |
| KR | 101059744 B1 | | 8/2011 |
| WO | 2007/109715 A1 | | 9/2007 |

OTHER PUBLICATIONS

Office Action dated Mar. 22, 2019 in JP Application No. 2016110093.

* cited by examiner

FIRST EMBODIMENT

FIRST EMBODIMENT

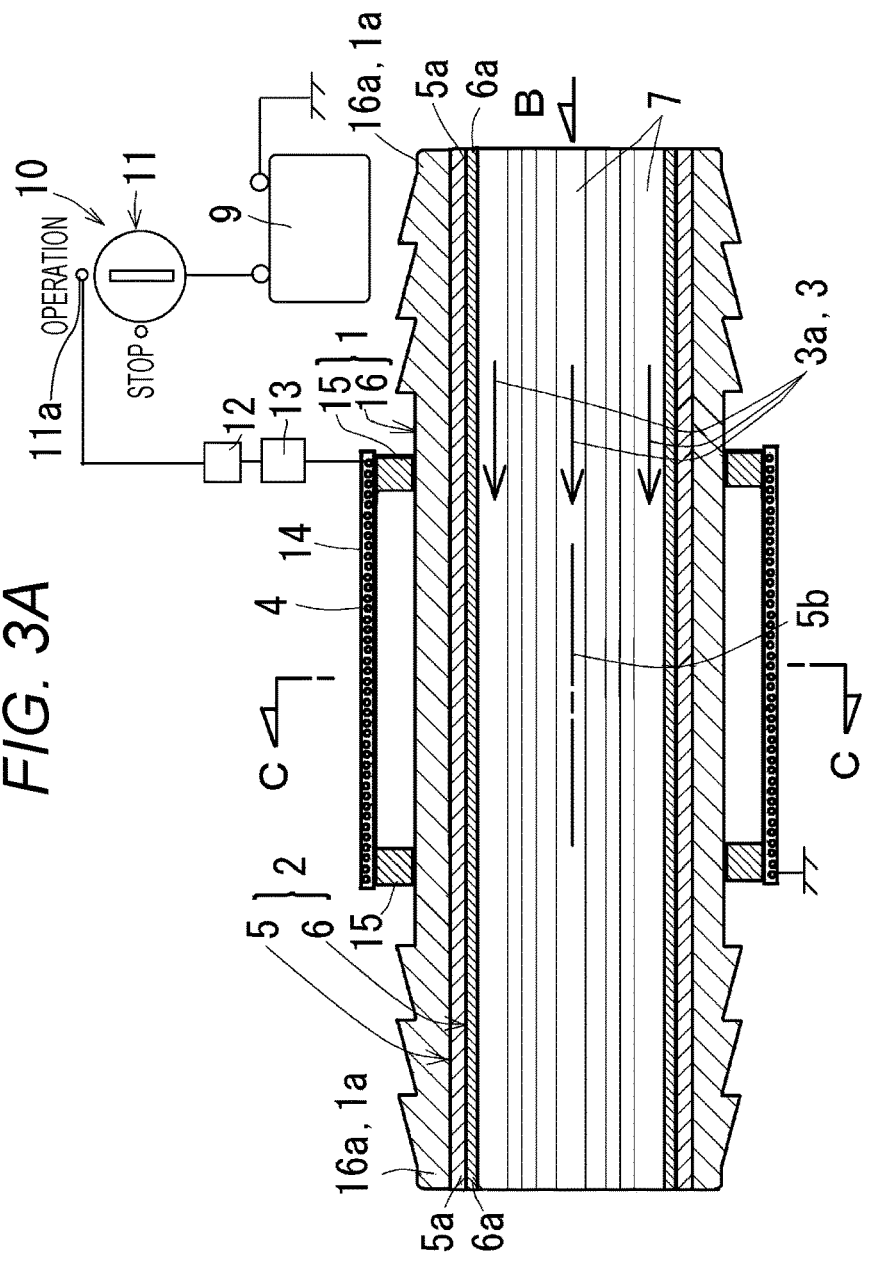
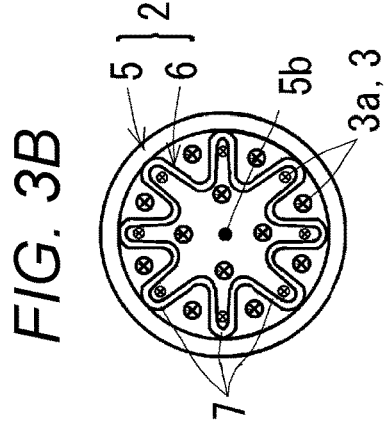
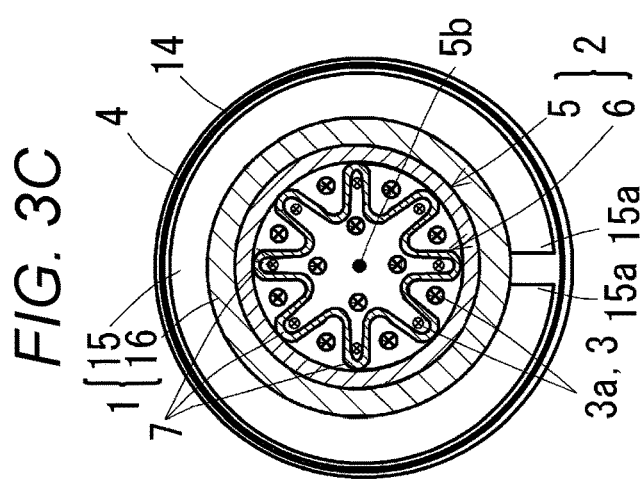

VARIATIONS OF SECOND EMBODIMENT

FIRST VARIATION

SECOND VARIATION

THIRD VARIATION

FOURTH VARIATION

BASIC EXAMPLE AND VARIATIONS OF THIRD EMBODIMENT
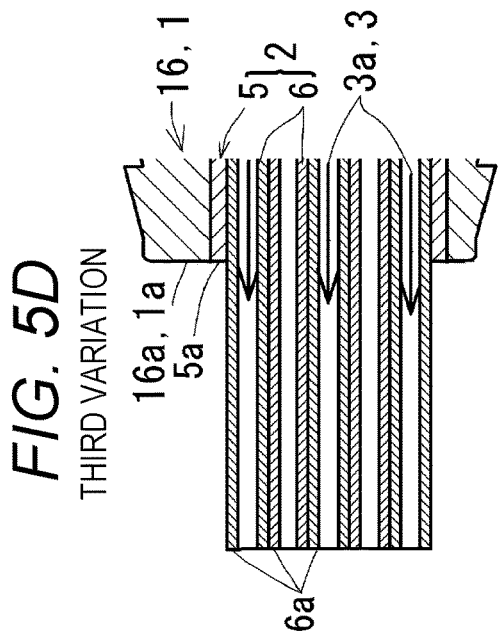
FIG. 5A BASIC EXAMPLE
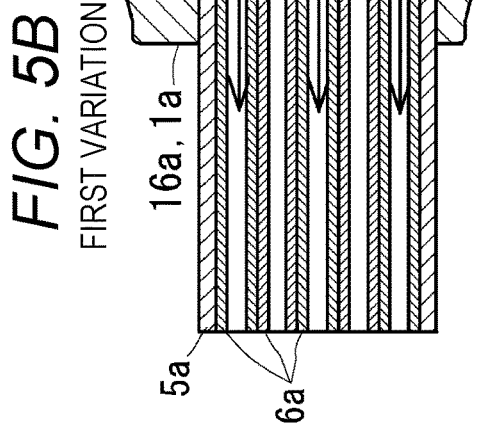
FIG. 5B FIRST VARIATION
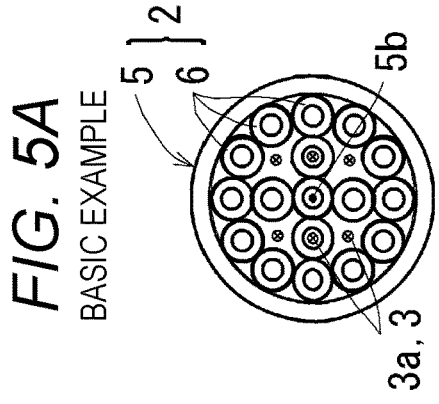
FIG. 5C SECOND VARIATION
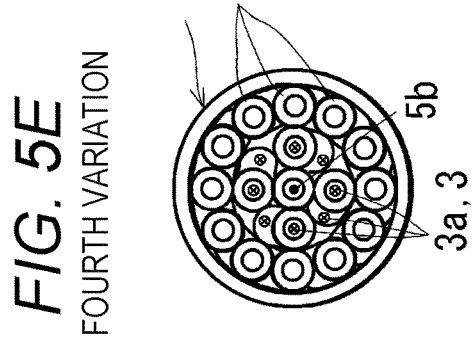
FIG. 5D THIRD VARIATION
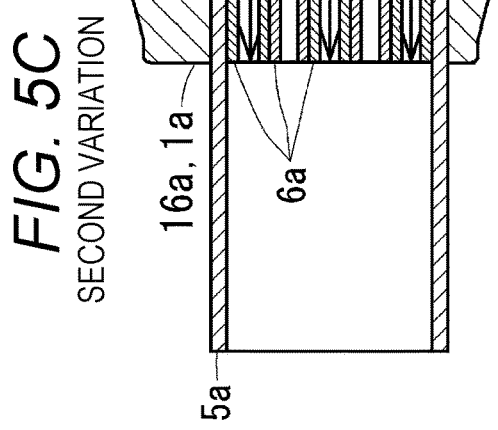
FIG. 5E FOURTH VARIATION

FOURTH EMBODIMENT

FLUID HEATING DEVICE OF ENGINE

BACKGROUND OF THE INVENTION (1) Field of the Invention

The present invention relates to a fluid heating device of an engine.

(2) Description of Related Art

Conventionally, a fluid heating device of an engine is configured that heat generated by a PTC heater is radiated to the fluid via the heat radiation pipe.

Problem

Power consumption of a heat source required for heating a fluid is increased.

In the conventional fluid heating device of an engine, thermal conduction loss from the beat source to the fluid occurs, heat efficiency of the heat source for heating the fluid is low, and power consumption of the heat source required for heating the fluid is increased.

SUMMARY OF THE INVENTION

An object of the present invention is to provide a fluid heating device of an engine capable of reducing power consumption of a heat source required for heating a fluid.

A fluid heating device of an engine, the fluid heating device comprising:

a heat radiation pipe through which a fluid passes; and
an IH coil,
wherein heat of the heat radiation pipe that is inductively heated by the IH coil is radiated to the fluid.

The present invention has the following effect.

Effect

Power consumption of a heat source required for heating the fluid can be reduced.

In the present invention, the heat radiation pipe can serve as the heat source by the induction heating of the IH coil. The heat is directly conducted from the heat source to the fluid, and there is no room for occurrence of thermal conducting loss from the heat source to the fluid. Heat transfer efficiency is high, and heat efficiency of the heat source for heating the fluid is high. Power consumption of the heat source required for heating the fluid can be reduced.

BRIEF DESCRIPTION OF THE DRAWINGS

FIGS. 1A to 1D are views explaining a fluid heating device of an engine according to a first embodiment of the present invention, wherein FIG. 1A is a side view of the fluid heating device, FIG. 1B is a sectional view taken along line B-B FIG. 1A, FIG. 1C is a sectional view taken along line C-C in FIG. 1A, and FIG. 1D is a sectional view taken along line D-D in FIG. 1B;

FIGS. 3A to 3C are views explaining a fluid heating device of an engine according to a second embodiment of the present invention, wherein FIG. 3A is a longitudinal sectional side view, FIG. 3B is an arrow view of a heat radiation pipe as viewed from direction B in FIG. 3A and FIG. 3C is a sectional view taken along line C-C in FIG. 3A;

FIGS. 4A to 4D are views explaining variations of the second embodiment of the present invention, wherein FIG. 4A is a longitudinal sectional side view of an end part of a first variation, FIG. 4B is a longitudinal sectional side view of an end part of second variation, FIG. 4C is a longitudinal sectional side view of an end part of a third variation, and FIG. 4D is a view corresponding to FIG. 1B of a heat radiation pipe in a fourth variation;

FIGS. 5A to 5E are views explaining a basic example and variations of a third embodiment of the present invention, wherein FIG. 5A is a view corresponding to FIG. 1B of a beat radiation pipe in the basic example, FIG. 5B is a longitudinal sectional side view of an end pan in a first variation, FIG. 5C is a longitudinal sectional side view of an end part in a second variation, FIG. 5D is a longitudinal sectional side view of an end part in a third variation, and FIG. 5E is a view corresponding to FIG. 3B of a heat radiation pipe in a fourth variation; and FIGS. 6A to 6D are views explaining a fluid heating device of an engine according to a fourth embodiment of the present invention, wherein FIG. 6A is a longitudinal sectional side view, FIG. 6B is an arrow view of a heat radiation pipe as viewed from direction B in FIG. 6A, FIG. 6C is a sectional view taken along line C-C in FIG. 6A, and FIG. 6D is a developed view of a coil housing body.

DETAILED DESCRIPTION OF PREFERRED EMBODIMENTS

Figure 1A:
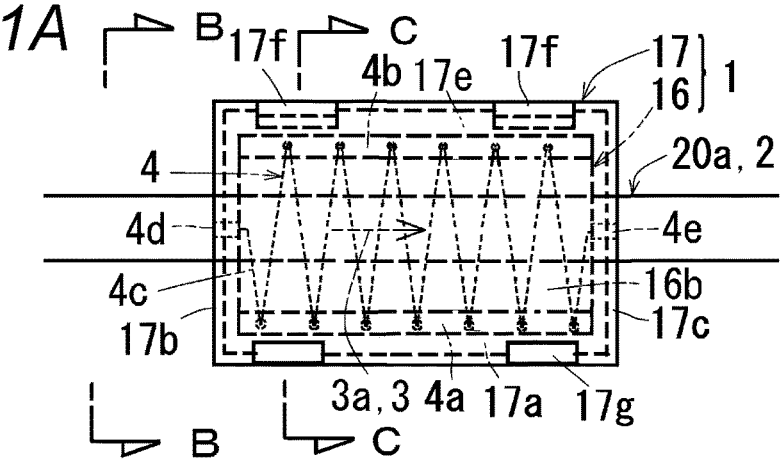
Figure 1B:
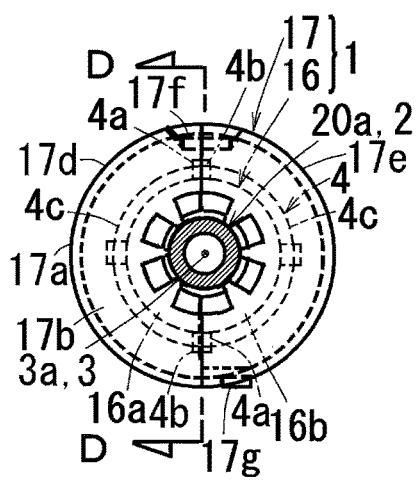

FIGS. 1A to 6D are views explaining a fluid heating device of an engine according to first to fourth embodiments of the present invention. In the respective embodiments, a fluid heating device for a vertical diesel engine is described.

The first embodiment shown in FIGS. 1A to 1D is described.

This fluid heating device is chides a heat radiation pipe (2) through which a fluid (3) passes and an cod (4), and is configured so that heat of the heat radiation pipe (2) that is inductively heated by the IH coil (4) is radiated to the fluid (3).

The fluid (3) is a blowby gas (3a).

Since this fluid heating device includes the IH coil (4) for inductively heating the heat radiation pipe (2), the heat radiation pipe (2) can serve as a heat source by the induction heating of the IH coil (4). The heat is directly conducted from the heat source to the fluid (3), and there is no room for occurrence of thermal conducting loss from the heat source to the fluid. Heat transfer efficiency is high, and heat efficiency of the heat source for heating the fluid (3) is high. Power consumption of the heat source required for heating the fluid (3) can be reduced.

The heat radiation pipe (2) is a heat radiation conveyance pipe for conveying the fluid (3), such as the blowby gas (3a), a drain oil (3b), and a liquid fuel.

The heat radiation pipe (2) is a steel pipe.

The heat radiation pipe (2) may be a pipe made of the other metal, such as copper or aluminum.

The IH is an abbreviation for induction heating, and the induction heating refers to heating by causing a current to flow using a principle of electromagnetic induction.

This fluid heating device includes a power supply (9), and an energization circuit (10) for electrically connecting the power supply (9) and the IH coil (4). The energization circuit (10) includes a key switch (11), a timer (12), and an IH control circuit (13). During engine operation in which the key switch (11) is turned into an engine operation position (11a), the heat radiation pipe (2) is inductively heated by energization from the power supply (9) to the IH coil (4) until a set time of the timer (12) elapses.

The IH control circuit (13) includes an inverter circuit part for transmitting a high frequency power to the IH coil (4) and a control part for controlling the inverter circuit part.

The power supply (9) is a battery.

In this fluid heating device, a whole periphery of the heat radiation pipe (2) is surrounded by the IH coil (4). Accordingly, the whole periphery of the heat radiation pipe (2) is inductively heated by the IH coil (4), and heating efficiency of the fluid (3) can be enhanced.

In this fluid heating device, the IH coil (4) is supported by the heat radiation pipe (2). Accordingly, even when the IH coil (4) receives vibrations of the engine, a relative arrangement between the IH coil (4) and the heat radiation pipe (2) is hardly changed, and fluctuations in an induction heating amount of the heat radiation pipe (2) caused by the vibrations can be suppressed.

This fluid heating device includes a holder (1), and the IH coil (4) is supported by the heat radiation pipe (2) via the holder (1). Accordingly, in this fluid heating device, electric leakage from the IH coil (4) to the heat radiation pipe (2) can be suppressed.

The holder (1) is an electrical insulator made of synthetic resin.

In this fluid heating device, the holder (1), to which the IH coil (4) is attached, is detachably supported by the heat radiation pipe (2). Accordingly, the IH coil (4) can be easily supported by the heat radiation pipe (2) via the holder (1).

In this fluid heating device, the holder (1) includes a case-shaped holder (17) and a tubular holder (16).

The case-shaped holder (17) includes a tubular case peripheral wall (17a) and case end walls (17b) (17c) provided at both end pans in an axial length direction thereof. The heat radiation pipe (2) is penetrated through both the case end walls (17b) (17c), and the case-shaped holder (17) is supported by the heat radiation pipe (2) via both the case end walls (17b) (17c).

The tubular holder (6) is attached to the case-shaped holder (17) inside the case-shaped holder (17).

The IH coil (4) is attached to the tubular holder (16) inside the case-shaped holder (17).

Inside the case-shaped holder (17), the heat radiation pipe (2) is concentrically surrounded from an outer periphery by the tubular holder (16) and the IH coil (4) on an outside thereof.

Because of this, in this fluid heating device, the tubular holder (16) and the IH coil (4) are compactly supported inside the case-shaped holder (17).

The case-shaped holder (17) and the tubular holder (16) are electrical insulators made of synthetic resin.

Both of the case-shaped holder (17) and the tubular holder (16) are electrical and thermal insulators made of synthetic resin.

Figure 1C:
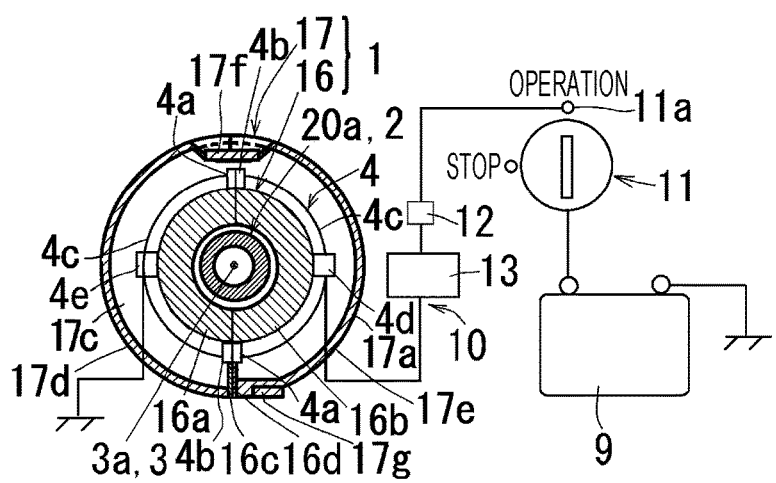
Figure 1D:
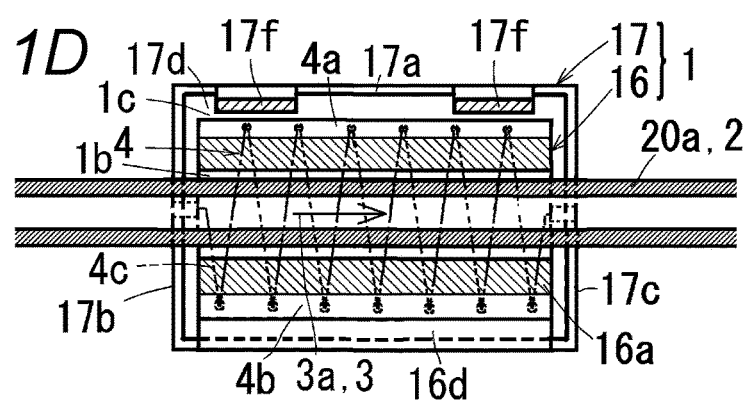

As shown in FIG. 1D, a heat insulating an layer (1b) is provided between the heat radiation pipe (2) and the tubular holder (16), and another heat insulating air layer (1c) is provided between the tubular holder (16) and a peripheral wall (17a) of the case-shaped holder (17). The IH coil (4) is housed inside the latter heat insulating air layer (1c).

In this fluid heating device, the case-shaped holder (17) includes a pair of half ease portions (17d) (17e) divided along the axial length direction thereof, a hinge (17f) for openably connecting the pair of half case portions (17d) (17e), and an engagement part (17g) for holding the pair of half case portions (17d) (17e) in a closed state.

In this fluid heating device, by closing the pair of half case portions (17d) (17e) opened on both sides of the outer periphery piffle heat radiation pipe (2), the penetrated heat radiation pipe (2) is sandwiched between both the case end walls (17b) (17c) of the pair of half case portions (17d) (17e), and the case-shaped holder (17) is configured to be supported by the heat radiation pipe (2). Accordingly, supporting work of the case-shaped holder (17) is facilitated.

In this fluid heating device, the tubular holder (16) includes a pair of semi-tubular portions (16a) (16b) divided along an axial length direction thereof.

The pair of semi-tubular portions (16a) (16b) of the tubular holder (16) is respectively attached to the pair of half case portions (17d) (17e) of the case-shaped holder (17).

In this fluid heating device, by closing the pair of half case portions (17d) (17e) opened on both the sides of the outer periphery of the heat radiation pipe (2), the pair of semi-tubular portions (16a) (16b) is configured to be the tubular holder (16) combined in a tubular form. Accordingly, assembling work of the tubular holder (16) is facilitated.

As shown in FIG. 1C, the pair of semi-tubular portions (16a) (16b) of the tubular holder (16) is individually attached to the pair of half case portions (17d) (17e) by a pair of attachment plates (16c) (16d). Both of the pair of attachment plates (16c) (16d) are electrical and thermal insulators made of synthetic resin.

In this fluid heating device, the IH soil (4) is configured with a pair of connectors (4a) (4b) respectively attached to respective end parts in a circumferential direction of the semi-tubular portions (16a) (16b) and a plurality of semi-arcuate electric wires (4c) disposed between the pair of connectors (4a) (4b).

By closing the pair of half case portions (17d) (17e) opened on both the sides of the outer periphery of the heat radiation pipe (2), the plurality of semi-arcuate electric wires (4c) (4c) is connected by bonding the connector (4a) attached to one of the pair of semi-tubular portions (16a) (16b) of the tubular holder (16) and the connector (4b) attached to another thereof, and the spiral coil (4) swirling around the outer periphery of the tubular holder (16) is configured to be formed with the connected plurality of electric wires (4c) (4c).

Because of this, in this fluid heating device, assembling work of the IH coil (4) is facilitated.

One of the pair of connectors (4a) (4b) to be bonded is a male connector and another thereof is a female connector.

As shown in FIGS. 1A to 1D, the one of the pair of connectors (4a) (4b) is the male connector and the other thereof is the female connector. One end part of the spiral IH coil (4) is provided with a positive side terminal (4d) electrically connecting with a positive electrode of the power supply (9), and another end part thereof is provided with a negative side terminal (4e) electrically connecting with a negative electrode of the power supply (9) through ground.

Figure 2:
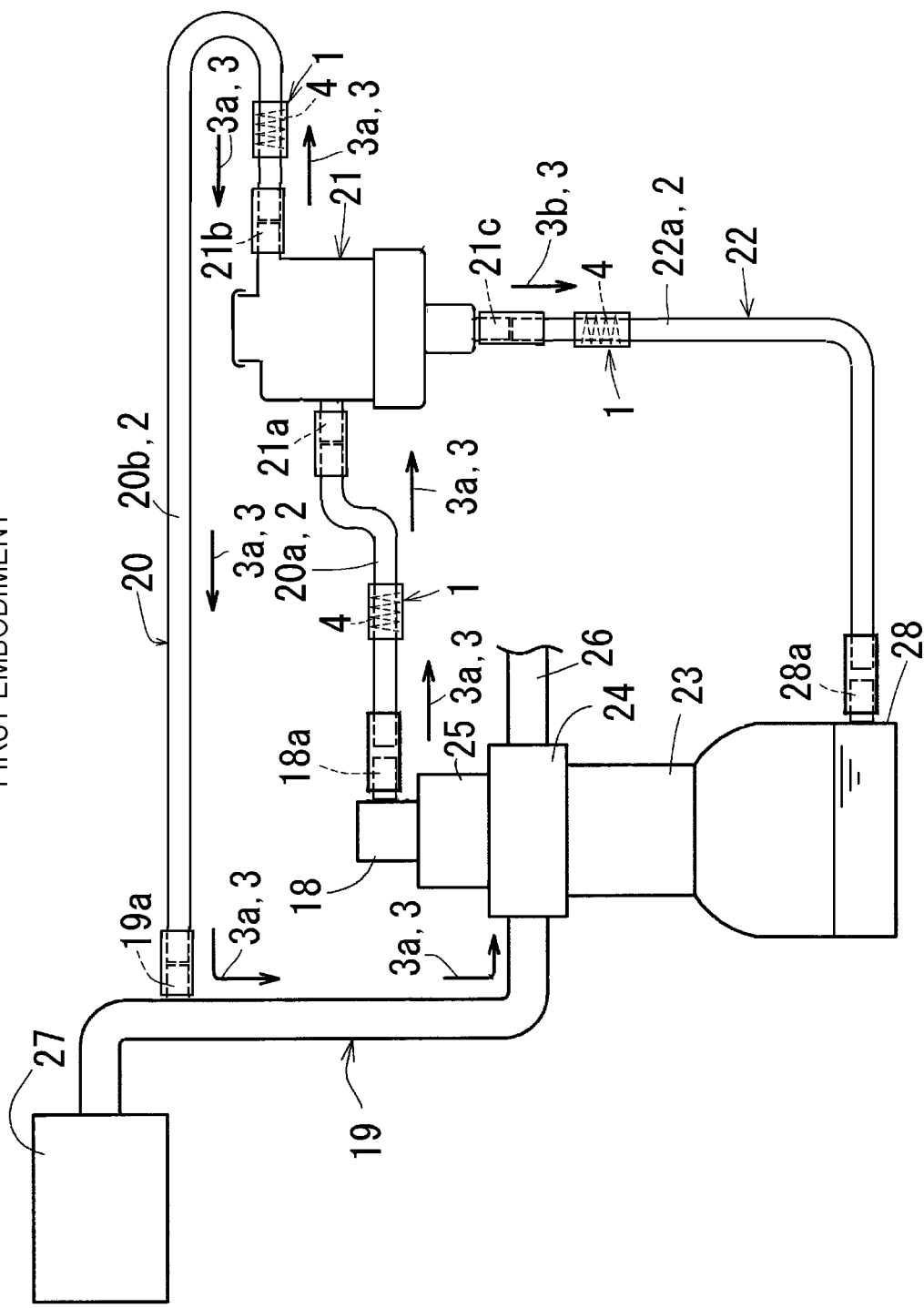
FIG. 2 is a schematic view of an engine incorporating the fluid heating device of the engine according to the first embodiment of the present invention.

As shown in FIG. 2, the engine provided with the fluid heating device includes a cylinder block (23), a cylinder head (24) assembled to an upper part of the cylinder block (23), a cylinder head cover (25) assembled to an upper part of the cylinder head (24), a breather chamber (18) provided on the cylinder head cover (25), an intake passage (19) and an exhaust passage (26) connected to the cylinder head (24), an air cleaner (27) connected to the intake passage (19) and an oil pan (28) provided at a lower part of the cylinder block (23). A blowby gas passage (20) is provided between the breather chamber (18) and the intake passage (19), and an oil separator (21) is disposed in the middle of the blowby gas passage (20).

Of the blowby gas passage (20), a first metallic pipe (20a) is disposed between a blowby gas outlet (18a) of the breather chamber (18) and a blowby gas inlet (21a) of the oil separator (21), and a second metallic pipe (20b) is disposed between a blowby gas outlet (21b) of the oil separator (21) and a blowby gas inlet (19a) of the intake passage (19).

In this fluid heating device, by closing the pair of semi-tubular portions (16a) (16b) on both sides of outer peripheries of the metallic pipes (20a) (20b) at an arbitrary position of the metallic pipes (20a) (20b), the IH coil (4) is attached to the arbitrary position of the metallic pipes (20a) (20b) via the holder (1).

Because of this, a degree of freedom of arranging the IH coil (4) of this fluid heating device is high.

In this case, the fluid (3) to be heated is the blowby gas (3a).

As shown in FIG. 2, this fluid heating device of the first embodiment is also used for an oil drain passage (22) of the oil separator (21) disposal between the breather chamber (18) and the intake passage (19). In this case, the heat radiation pipe (2 is configured with a metallic pipe (22a) of the oil drain passage (22). As with the metallic pipes (20a) (20b) of the blowby gas passage (20), the IH coil (4) is configured to be attached to an arbitrary position of the metallic pipe (22a) of the oil drain passage (22).

Because of this, a degree of freedom of arranging the IH coil (4) is high in this fluid heating device.

In this case, the fluid (3) to be heated is the drain oil (3b).

The metallic pipe (22a) of the oil drain passage (22) is plumbed between an oil drain outlet (21c) of the oil separator (21) and an oil drain inlet (28a) of the oil pan (28).

Next, a basic example of a second embodiment shown in FIGS. 3A to 3C is described.

As shown in FIGS. 3A, 3C, an IH coil (4) is disposed outside of a holder (1). Because of this, in this basic example, there is no need to take out a wiring line from inside of the holder (1) to outside of the holder (1), and wiring work is facilitated. Further, in this basic example, the IH coil (4) can be replaced outside of the holder (1) when the IH coil (4) fails, and repair is facilitated.

As shown in FIGS. 3A and 3C, the spiral IH coil (4) is externally fitted to the holder (1). Because of this, a whole periphery of a heat radiation pipe (2) is inductively heated by the cod (4), and heating efficiency of the heat radiation pipe (2) can be enhanced.

As shown in FIGS. 3A, 3C, the IH coil (4) is covered with a cylindrical cover (14). The holder (1) includes a tubular holder (16) and a pair of arcuate spacers (15) (15). The tubular holler (16) is externally fitted and fixed to the heat radiation pipe (2). The spacer (15) has elasticity and flexibility, and is curved into an arc shape along an outer periphery of the tubular holder (16). Both end parts (15a) (15a) in a curving direction face each other. Both the end parts (15a) (15a) are opened against elastic force, and both the end parts (15a) (15a) are brought close to each other by the elastic force. Accordingly, both the end pans (15a) (15a) are attached to the outer periphery of the tubular holder (16) or detached from the outer periphery of the tubular holder (16).

Both of the tubular holder (16) and the pair of arcuate spacers (15) (15) configuring the holder (1) are electrical and thermal insulators made of synthetic resin.

As shown in FIGS. 3A to 3C, the heat radiation pipe (2) includes an outer pipe (5) and an inner pipe (6) housed inside litis outer pipe (5), and a fluid (3) passing through an inside of the heat radiation pipe (2) is configured to be heated by radiation heal from the outer pipe (5) and the inner pipe (6).

Became of this, in this fluid heating device, a heat radiation area of the fluid (3) can be increased, and heat radiation can be performed on the fluid (3) passing through a center part of the outer pipe (5) at a short distance from the inner pipe (6). Heating efficiency of the fluid (3) can be enhanced.

As shown in FIGS. 3A to 3C, the inner pipe (6) is configured with radial folds (7) whose peripheral wall is alternately folded back inside and outside, as viewed from a direction parallel to a center axis (5b) of the outer pipe (5). Because of this, a heat radiation area of the inner pipe (6) can be increased, and the heating efficiency of the fluid (3) can be enhanced.

As shown in FIGS. 3B, 3C, the outer pipe (5) is a round pipe.

In the basic example of the second embodiment shown in FIGS. 3A to 3C, the following configuration is employed.

The only one inner pipe (6) is used and disposed concentrically with the outer pipe (5). A direction of the folds (7) extending in an axial length direction of the outer pipe (5) is parallel to the center axis (5b) of the outer pipe (5).

Both of an end pan (5a) of the outer pipe (5) and an end part (6a) of the inner pipe 6) are not protruded outward from an end part (1a) of the holder (1), that is, an end part (16a) of the tubular holder (16).

The outer pipe (5) and the inner pipe (6) are steel pipes.

The outer pipe (5) and the inner pipe (6) may be pipes made of the other metal, such as copper or aluminum.

Other structures of the basic example of the second embodiment shown in FIGS. 3A to 3C are the same as those in the first embodiment shown in FIGS. 1A to 1D. In FIGS. 3A to 3C, the same reference signs as those in FIGS. 1A to 1D are used to designate elements identical to those in the first embodiment.

Figure 4A:
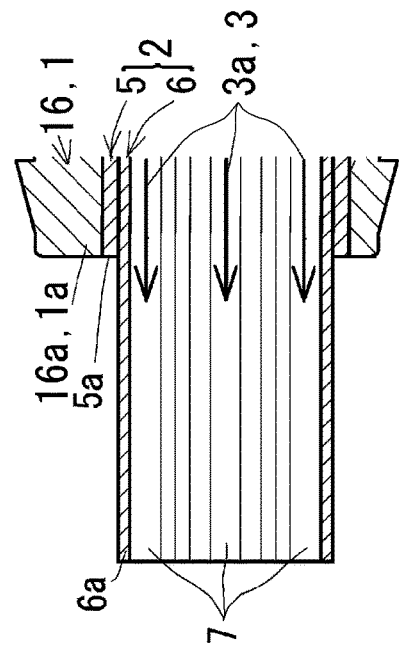
Figure 4B:
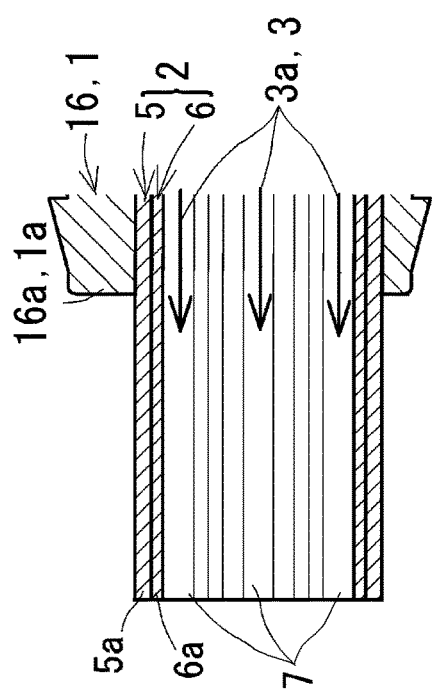
Figure 4C:
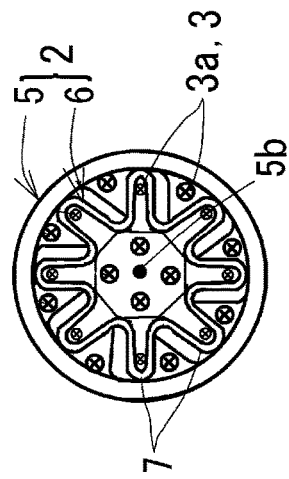

First to third variations of the second embodiment shown in FIGS. 4A to 4C are described.

In the basic example of the second embodiment shown in FIG. 3, both of the respective end parts (5a) (6a) of the outer pipe (5) and the inner pipe (6) do not protrude outward from the end part (1a) of the holder (1), that is, the end part (16a) of the tubular holder (16).

Contrary to this, in the first variation of the second embodiment shown in FIG. 4A, one end part (5a) of an outer pipe (5) and one end part (6a) of an inner pipe (6), which are on the same side, are protruded outward from one end part (1a) of a holder (1). In the second variation of the second embodiment shown in FIG. 4B, only one end part (5a) of an outer pipe (5) is protruded outward from one end part (1a) of a holder (1). In the third variation of the second embodiment shown in FIG. 4C, only one end part (6a) of an inner pipe (6) is protruded outward from one end part (1a) of a holder (1).

In the present invention, a least one end part of the respective both end parts (5a) (6a) of the outer pipe (5) and the inner pipe (6) may be protruded outward from the end part (1a) of the holder (1).

Other structures of the first to third variations of the second embodiment shown in FIGS. 4A to 4C are the same as those is the basic example of the second embodiment shown in FIGS. 3A to 3C.

Figure 4D:
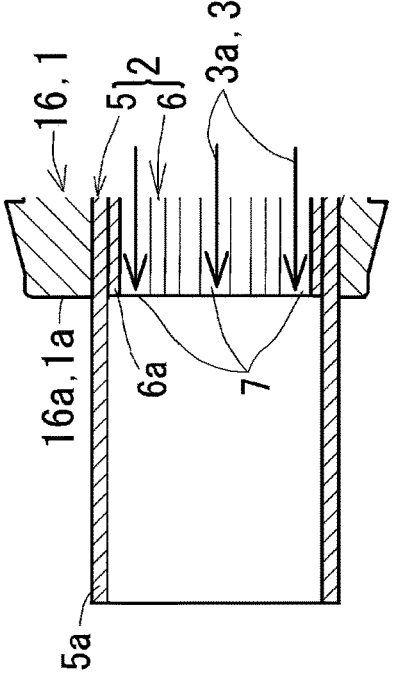

A fourth variation of the second embodiment shown in FIG. 4D is described.

In the basic example of the second embodiment shown in FIGS. 3A to 3C and the first to third variations of the second embodiment shown in FIGS. 4 to 4C, a direction of the folds (7) extending in an axial length direction of the outer pipe (5) is parallel to the center axis (5b) of the outer pipe (5).

Contrary to this, in the fourth variation of the second embodiment shown in FIG. 4D, folds (7) extending in an axial length direction of an outer pipe (5) intersect in an inclined manner with a direction parallel to a center axis (5b) of the outer pipe (5).

This fold (7) is spirally twisted around the center axis (5b) of the outer pipe (5). The fold (7) may be formed straight and not twisted.

Other structures of the fourth variation of the second embodiment shown in FIG. 4D are the same as those in the basic example of the second embodiment shown in FIGS. 3A to 3C.

A structure of the fourth variation of the second embodiment shown in FIG. 4D can be used in combination with the structures of the first to third variations of the second embodiment shown in FIGS. 4A to 4C.

A structure of the heat radiation pipe (2) formed of the inner and outer pipes in the basic example and the respective variations of the second embodiment shown in FIGS. 3A to 3C, FIGS. 4A to 4D can be used in the first embodiment shown in FIGS. 1A to 1D.

A basic example of a third embodiment shown in FIG. 5A is described.

In the basic example of the second embodiment shown in FIG. 3A, the only one inner pipe (6) is used and disposed concentrically with the outer pipe (5).

Contrary to this, in the basic example of the third embodiment shown in FIG. 5A, a plurality of inner pipes (6) is bundled and disposed inside an outer pipe (5).

All of the inner pipes (6) are round pipes.

Other structures of the basic example of the third embodiment shown in FIG. 5A are the same as those in the basic example of the second embodiment shown in FIGS. 3A to 3C. In FIG. 5A, the same reference signs as those in FIG. 3B are used to designate elements identical to those in the basic example of the second embodiment.

First to third variations of the third embodiment shown in FIGS. 5B to 5D are described.

In the basic example of the third embodiment shown in FIG. 5A, as with the basic example of the second embodiment shown in FIG. 3A, both of respective end parts (5a) (6a) of the outer pipe (5) and the inner pipe (6) are not protruded outward from an end part (1a) of a holder (1), that is, an end pan (16a) of a tubular holder (16).

Contrary to this, in the first variation of the third embodiment shown in FIG. 5B, one end part (5a) of an outer pipe (5) and one end part (6a) of an inner pipe (6), which are on the same side, are protruded outward from an end part (1a) of a holder (1). In the second variation of the third embodiment shown in FIG. 5C, only one end part (5a) of an outer pipe (5) is protruded outward from an end part (1a) of a holder (1). In the third variation of the third embodiment shown in FIG. 5D, only one end part (6a) of an inner pipe (6) is protruded outward from an end part (1a) of a holder (1).

In the present invention, at least one end part of the respective both end parts (5a) (6a) of the outer pipe (5) and the inner pipe (6) may be protruded outward from the end part (1a) of the holder (1).

Other structures of the first to third variations of the third embodiment shown in FIGS. 5B to 5D are the same as those in the basic example of the second embodiment shown in FIG. 3A.

FIG. 5E shows a fourth variation of the third embodiment.

In the basic example of the third embodiment shown in FIG. 5A and the first to third variations of the third embodiment shown in FIGS. 5B to 5D, a direction of the inner pipe (6) is parallel to a center axis (5b) of the outer pipe (5).

Contrary to this, in the fourth variation of the third embodiment shown in FIG. 5E, an inner pipe (6) intersects in an inclined manner with a direction parallel to a center axis (5b) of an outer pipe (5).

This inner pipe (6) is spirally twisted around the center axis (5b) of the outer pipe (5). The inner pipe (6) may be formed straight and not twisted.

Other structures of the fourth variation of the third embodiment shown in FIG. 5E are the same as those in the basic example of the third embodiment shown in FIG. 5A.

A structure of the fourth variation of the third embodiment shown in FIG. 5E can be used m combination with the structures of the first to third variations of the third embodiment shown in FIGS. 5B to 5D.

A fourth embodiment shown in FIGS. 6A to 6D is described.

Figure 6A:
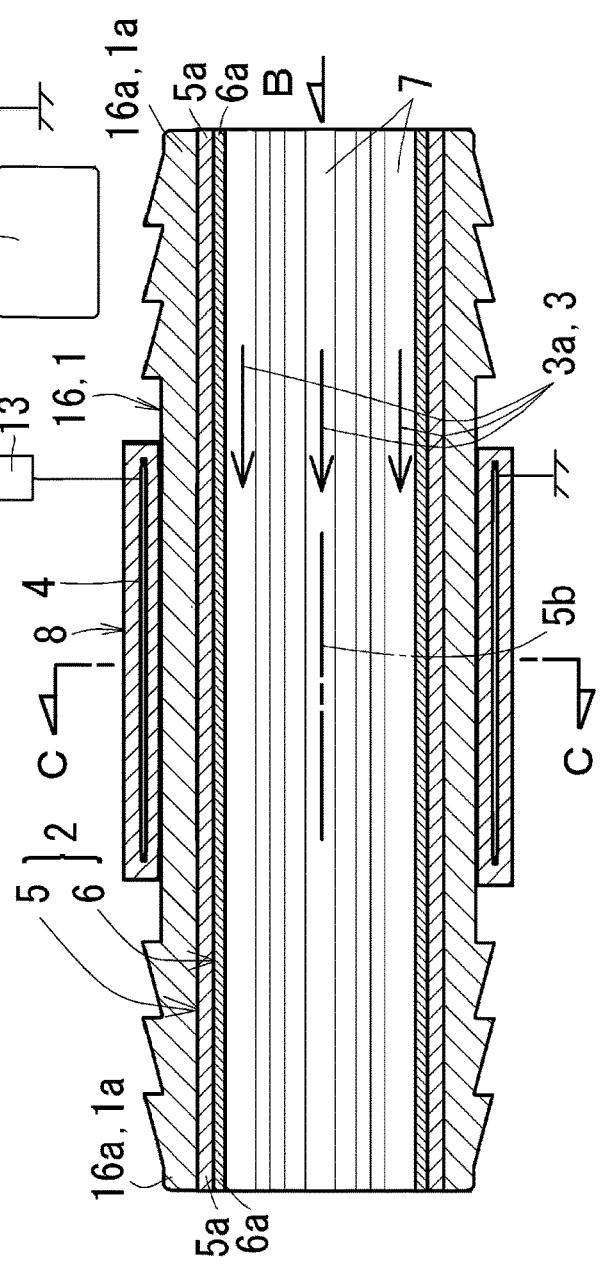
Figure 6B:
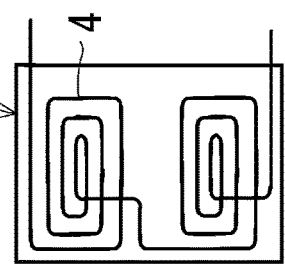
Figure 6C:
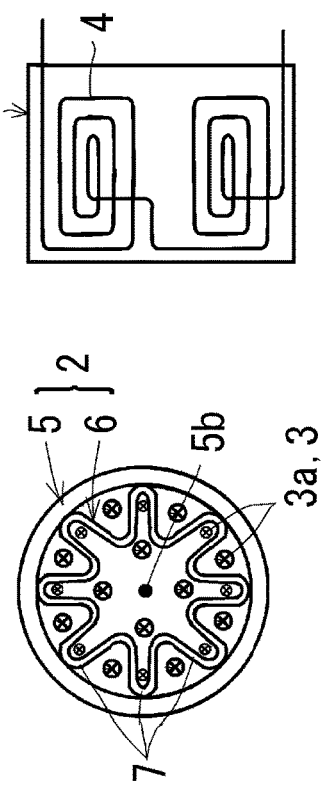
Figure 6D:
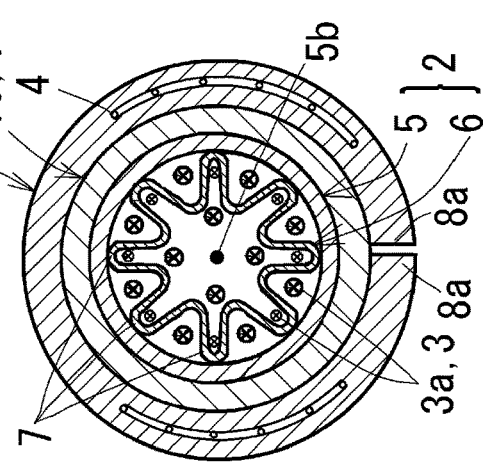

As shown in FIGS. 6A, 6C, 6D, an IH coil (4) is housed in a coil housing body (8). As shown in FIG. 6C, in a state in which the coil housing body (8) is curved along an outer periphery of a holder (1), curving direction both end edge parts (8a) (8a) face each other. The coil housing body (8) has flexibility and is detachably attached to the outer periphery of the bolder (1). Because of this, the coil housing body (8) can be attached to the otter periphery of the holder (1) or the coil housing body (8) can be detached from the outer periphery of the holder (1) by opening the curving direction both end edge parts (8a) (8a). The IH coil (4) is easily attached to or detached from the holder (1).

The coil housing body (8) is made of synthetic resin having elasticity, and is a rectangle when it is developed as shown in FIG. 6D. As shown in FIG. 6C, the coil housing body (8) is curved into an arc shape along the outer periphery of the holder (1), and the curving direction both end edge parts (8a) (8a) face each other. Both the end edge parts (8a) (8a) are opened against elastic force. By bringing both the end edge parts (8a) (8a) close to each other by the elastic force, the coil housing body (8) is attached to the outer pc of the holder (1). Alternatively, both the end edge parts (8a) (8a) are opened against the elasticity, and the coil housing body (8) is detached from the outer periphery of the holder (1).

The IH coil (4) is embedded in the coil housing body (8). The holder (1) is configured with a tubular bolder (16), and the tubular holder (16) is externally fitted and fixed to a heat radiation pipe (2).

Other structures of the fourth embodiment shown in FIGS. 6A to 6D are the same as those in the basic example of the second embodiment shown in FIGS. 3A to 3C. In FIGS. 6A to 6D, the same reference signs as those in FIGS. 3A to 3C are used to designate elements identical to those in the basic example of the second embodiment.

In the fluid heating device of an engine in the respective basic examples and the respective variations of the second to fourth embodiments shown in FIGS. 3A to 6D, the one end part (1a) of the holder (1) is inserted into the blowby gas inlet (21a) of the oil separator (21) shown in FIG. 2, and a blowby gas introduction pipe (not shown) led out from a breather device (not shown) of the engine is connected to the other end part (1a) thereof. The blowby gas (3a) introduced from the breather chamber (18) into the oil separator (21) is heated. The fluid heating device can be used to prevent freezing of moisture contained in the blowby gas (3a) and to prevent closing of the blowby gas passage (20) at cold start or subsequent warm-up operation of the engine. Further, the one end part (1a) of holder (1) is, inserted into the blowby gas outlet (21b) of the oil separator (21), and a blowby gas leading-out pipe (not shown) communicated with the intake passage (19) is connected to the other end part (1a) thereof. The blowby gas (3a) led out from the oil separator (21) into the intake passage (19) is heated. The fluid heating device can be used to prevent freezing of moisture contained in the blowby gas (3a) and to prevent closing of the blowby gas passage (20) at cold start or subsequent warm-up operation of the engine. Further, this fluid heating device of the engine can be disposed at an arbitrary position in the middle of the blowby gas passage (20).

Further, in the fluid heating device of the engine in the respective basic examples and the respective variations of the second to fourth embodiments shown in FIGS. 3A to 6D, the one end part (1a) of the holder (1) is inserted into a fuel inlet of a fuel supply pump (not shown), and a fuel introduction pipe (not shown) led out from a fuel tank (not shown) of the engine is connected to the other end part (1a) thereof. Fuel introduced from the fuel tank to the fuel supply pump is heated. The fluid beating device can be used to prevent freezing of the fuel in the fuel supply pump and to prevent closing of a fuel passage at cold start or subsequent warm-up operation of the engine. Further, the one end part (1a) of the holder (1) is inserted into a fuel outlet of the fuel supply pump (not shown), and a fuel leading-out pipe (not shown) communicated with a fuel injection pump (not shown) of a diesel engine is connected to the other end part (1a) thereof. Fuel led out from the fuel supply pump to the fuel injection pump is heated. The fluid beating device can be used to prevent freezing of moisture contained the fuel and to prevent closing of the fuel passage at cold start or subsequent warm-up operation of the engine. Further, this fluid heating device of the engine can be disposed at an arbitrary position of the fuel passage, such as in the middle of the fuel supply pipe. The first embodiment shown in FIGS. 1A to 1D can be also used as a fuel heating device.

What is claimed is:

1. A fluid heating device of an engine, the fluid heating device comprising:
    a heat radiation pipe through which a fluid passes;
    an induction heating coil; and
    a holder,
    wherein heat of the heat radiation pipe that is inductively heated by the induction heating coil is radiated to the fluid, and
    wherein the holder includes a case-shaped holder and a tubular holder, the case-shaped holder includes a tubular case peripheral wall and case end walls provided at both end parts in an axial length direction of the case-shaped holder, the heat radiation pipe is penetrated through both the case end walls, and the case-shaped holder is supported by the heat radiation pipe via both the case end walls, the tubular holder is attached to the case-shaped holder inside the case-shaped holder, the induction heating coil is attached to the tubular holder inside the case-shaped holder, and inside the case-shaped holder, the heat radiation pipe is concentrically surrounded from an outer periphery by the tubular holder and the induction heating coil on outside of the tubular holder.

2. The fluid heating device of the engine according to claim 1, wherein the case-shaped holder includes a pair of half case portions divided along the axial length direction of the case-shaped holder, a hinge for openably connecting the pair of half case portions, and an engagement part for holding the pair of half case portions in a closed state, and
    by closing the pair of half case portions opened on both sides of the outer periphery of the heat radiation pipe, the penetrated heat radiation pipe is sandwiched between both the case end walls of the pair of half case portions, and the case-shaped holder is configured to be supported by the heat radiation pipe.

3. The fluid heating device of the engine according to claim 2, wherein the tubular holder includes a pair of semi-tubular portions divided along an axial length direction of the tubular holder,
    the pair of semi-tubular portions of the tubular holder is respectively attached to the pair of half case portions of the case-shaped holder, and
    by closing the pair of half case portions opened on both the sides of the outer periphery of the heat radiation pipe, the pair of semi-tubular portions is configured to be the tubular holder combined in a tubular form.

4. The fluid heating device of the engine according to claim 3, wherein the induction heating coil is configured with a pair of connectors respectively attached to respective end parts in a circumferential direction of the semi-tubular portions and a plurality of semi-arcuate electric wires disposed between the pair of connectors, by closing the pair of half case portions opened on both the sides of the outer periphery of the heat radiation pipe, the plurality of semi-arcuate electric wires is connected by bonding the connector attached to one of the pair of semi-tubular portions of the tubular holder and the connector attached to another of the pair of semi-tubular portions, and the spiral induction heating coil swirling around an outer periphery of the tubular holder is configured to be formed with the connected plurality of electric wires.

5. The fluid heating device of the engine according to claim 1, wherein a first heat insulating air layer is provided between the heat radiation pipe and the tubular holder, a second heat insulating air layer is provided between the tubular holder and a peripheral wall of the case-shaped holder, and the induction heating coil is housed in the second heat insulating air layer.

6. The fluid heating device of the engine according to claim 1, wherein a first heat insulating air layer is provided between the heat radiation pipe and the tubular holder, a second heat insulating air layer is provided between the tubular holder and a peripheral wall of the case-shaped holder, and the induction heating coil is disposed and supported within the second heat insulating air layer.

7. The fluid heating device of the engine according to claim 6, wherein the first heat insulating air layer is configured to be a hollow layer continuing in a circumferential direction of the heat radiation pipe and the tubular holder, and the induction heating coil, except for a portion of a terminal and a connector supported by the tubular holder, is apart from the tubular holder.

8. The fluid heating device of the engine according to claim 7, wherein the induction heating coil is apart from the peripheral wall of the case-shaped holder.

9. A fluid heating device of an engine, the fluid heating device comprising:
    a heat radiation pipe through which a fluid passes; and
    an induction heating coil,
    wherein heat of the heat radiation pipe that is inductively heated by the induction heating coil is radiated to the fluid,
    wherein the heat radiation pipe is configured with metallic pipes of a blowby gas passage disposed between a breather chamber and an intake passage, and the induction heating coil is configured to be attached to an arbitrary position of these metallic pipes.

10. A fluid heating device of an engine, the fluid heating device comprising:
a heat radiation pipe through which a fluid passes; and
an induction heating coil,
wherein heat of the heat radiation pipe that is inductively heated by the induction heating coil is radiated to the fluid,
wherein the heat radiation pipe is configured with a metallic pipe of an oil drain passage of an oil separator disposed between the breather chamber and the intake passage, and the induction heating coil is configured to be attached to an arbitrary position of this metallic pipe.

11. A fluid heating device of an engine, the fluid heating device comprising:
a heat radiation pipe through which a fluid passes; and
an induction heating coil,
wherein heat of the heat radiation pipe that is inductively heated by the induction heating coil is radiated to the fluid,
wherein a holder is included, and the induction heating coil is supported by the heat radiation pipe via the holder, and
wherein the induction heating coil is disposed outside of the holder.

12. The fluid heating device of the engine according to claim 11, wherein the spiral induction heating coil is externally fitted to the holder.

13. The fluid heating device of the engine according to claim 12, wherein the induction heating coil is supported by a coil housing body, curving direction both end edge parts face each other in a state in which the coil housing body is curved along an outer periphery of the holder, and the coil housing body has flexibility and is detachably attached to the outer periphery of the holder.

14. The fluid heating device of the engine according to claim 11, wherein
the heat radiation pipe includes an outer pipe and an inner pipe housed inside this outer pipe, and the fluid passing through the inside of the heat radiation pipe is configured to be heated by radiation heat from the outer pipe and the inner pipe.

15. The fluid heating device of the engine according to claim 14, wherein the inner pipe is configured with radial folds whose peripheral wall is alternately folded back inside and outside, as viewed from a direction parallel to a center axis of the outer pipe.

16. A fluid heating device of an engine, the fluid heating device comprising:
a heat radiation pipe through which a fluid passes; and
an induction heating coil,
wherein heat of the heat radiation pipe that is inductively heated by the induction heating coil is radiated to the fluid,
wherein the heat radiation pipe includes an outer pipe and an inner pipe housed inside this outer pipe, and the fluid passing through the inside of the heat radiation pipe is configured to be heated by radiation heat from the outer pipe and the inner pipe, and
wherein at least one end part of respective end parts of the outer pipe and the inner pipe is protruded outward from the end part of a holder.

17. A fluid heating device of an engine, the fluid heating device comprising:
a heat radiation pipe through which a fluid passes; and
an induction heating coil,
wherein heat of the heat radiation pipe that is inductively heated by the induction heating coil is radiated to the fluid,
wherein the heat radiation pipe includes an outer pipe and an inner pipe housed inside this outer pipe, and the fluid passing through the inside of the heat radiation pipe is configured to be heated by radiation heat from the outer pipe and the inner pipe,
wherein the inner pipe is configured with radial folds whose peripheral wall is alternately folded back inside and outside, as viewed from a direction parallel to a center axis of the outer pipe, and
wherein the folds of the inner pipe extend in an axial length direction of the outer pipe and intersect in an inclined manner with the direction parallel to the center axis of the outer pipe.

18. A fluid heating device of an engine, the fluid heating device comprising:
a heat radiation pipe through which a fluid passes; and
an induction heating coil,
wherein heat of the heat radiation pipe that is inductively heated by the induction heating coil is radiated to the fluid,
wherein the heat radiation pipe includes an outer pipe and an inner pipe housed inside this outer pipe, and the fluid passing through the inside of the heat radiation pipe is configured to be heated by radiation heat from the outer pipe and the inner pipe, and
wherein a plurality of the inner pipes are bundled and disposed inside the outer pipe.

19. The fluid heating device of the engine according to claim 18, wherein the inner pipes intersect in an inclined manner with the direction parallel to the center axis of the outer pipe.

* * * * *